United States Patent [19]

Perla et al.

[11] 4,201,743

[45] May 6, 1980

[54] METHOD OF MAKING SOAP BARS

[75] Inventors: Guilio Perla; Alessandro D'Arcangeli, both of Rome, Italy

[73] Assignee: Colgate-Palmolive Company, New York, N.Y.

[21] Appl. No.: 821,852

[22] Filed: Aug. 4, 1977

Related U.S. Application Data

[60] Division of Ser. No. 461,915, Apr. 18, 1974, abandoned, which is a continuation of Ser. No. 252,837, May 12, 1972, abandoned.

[30] Foreign Application Priority Data

May 27, 1971 [IT] Italy .............................. 50528 A/71

[51] Int. Cl.[2] ............................................. B29C 17/00

[52] U.S. Cl. .................................... 264/148; 252/370; 264/75; 264/171

[58] Field of Search ................. 264/75, 171, 245, 320, 264/108, 148; 425/131.1; 252/174, 370, 367, 371

[56] References Cited

U.S. PATENT DOCUMENTS

| | | | |
|---|---|---|---|
| 56,068 | 7/1866 | Lincoln | 252/134 |
| 164,606 | 6/1875 | Stranz | 252/134 |
| 1,791,359 | 2/1931 | Henriksen | 252/134 |
| 1,978,163 | 10/1934 | Megow | 264/177 R |
| 2,133,666 | 10/1938 | Mills | 252/370 |
| 2,174,779 | 10/1939 | Delorme | 264/75 |
| 2,213,772 | 9/1940 | Strain | 252/367 |
| 2,292,359 | 8/1942 | Block | 252/90 |
| 2,295,596 | 9/1942 | Mills | 252/367 |
| 2,296,842 | 9/1942 | Garvey et al. | 264/148 |
| 2,423,435 | 7/1947 | Block | 252/90 |
| 2,473,530 | 6/1949 | Knoll | 252/370 |
| 2,494,891 | 1/1950 | Marshall | 252/367 |
| 2,495,005 | 1/1950 | Hoglic | 264/245 |
| 2,640,033 | 5/1953 | Marshall | 264/148 |
| 2,985,556 | 5/1961 | Rowland | 264/177 R |
| 3,294,692 | 12/1966 | Kelly et al. | 252/174 |
| 3,520,816 | 7/1970 | DeAcetis et al. | 252/108 |
| 3,523,909 | 8/1970 | Bradley et al. | 252/370 |
| 3,531,828 | 10/1970 | Nauta | 264/75 |
| 3,676,538 | 7/1972 | Patterson | 264/171 |
| 3,706,825 | 12/1972 | Hall et al. | 264/171 |
| 3,718,534 | 2/1973 | Okamoto et al. | 264/171 |
| 3,725,192 | 4/1973 | Ando et al. | 264/171 |
| 3,884,605 | 5/1975 | Greon | 264/75 |
| 3,923,438 | 12/1975 | Perla | 425/131.1 |

*Primary Examiner*—Jay H. Woo
*Attorney, Agent, or Firm*—Herbert S. Sylvester; Murray M. Grill; John A. Stemwedel

[57] ABSTRACT

Soap bars having indicia extending between, and visible on opposing major faces, and process and apparatus for producing same, is disclosed. The indicia forming material is preferably a soap material having physical and chemical characteristics, except for coloration, similar to those of the base soap material making up the soap bar. The indicia material is extruded through indicia forming dies into the base soap mass immediately prior to the plodder nozzle which rough forms the final soap bar.

6 Claims, 6 Drawing Figures

METHOD OF MAKING SOAP BARS

This is a divisional of application Ser. No. 461,915 filed Apr. 18, 1974 now abandoned, which application is a continuation of Ser. No. 252,837 filed: May 12, 1972 now abandoned.

The present invention pertains to the production of soap bars containing indicia, such as letters, numbers, trademarks, designs, trade names, etc. Specifically the invention provides a method and apparatus for producing soap bars having indicia forming material extending between parallel faces of the bar.

The desirability of including indicia on or in soap bars has long been recognized and has been practiced for many years. Typically, the desired indicia is pressed or engraved into a face of the soap bar. The major drawbacks of this method of providing indicia on soap bars is the lack of distinctiveness of such engraved logos and, of course, the fact that the indicia dissolves away shortly after the soap has been put to use.

Although the desirability of inserting indicia into soap bars in such a way that it remains legible throughout the life of the bar has been recognized, numerous problems have been encountered in developing a commercially feasible method for accomplishing this objective. Attempts to insert indicia in the form of plastic water soluble substances extending through the soap bar have resulted in illegible or indistinct lettering, surface roughness, separation of the indicia forming material from the base soap material during use, and various other problems that have usually rendered the resulting product commercially worthless.

A primary advantage of the present invention is to provide indicia containing soap bars that substantially maintain their integrity throughout the useful life of the bar and are free from serious surface roughness and cracks. A further advantage of the invention is to provide a method and apparatus for producing soap bars of this type having indicia forming material extending between and visible on parallel major faces of the bar.

Advantageously, the indicia forming portion of the new bars comprises a plastic water-soluble substance that contrasts with the base soap material. Most advantageously, the plastic insert portion is a soap having a chemical composition and physical properties, including water-solubility, softeness, moisture content, and crystalline structure, particular beta phase content, substantially the same as those of the base soap material.

Generally, soap materials, even though having substantially the same chemical composition, do not necessarily have the same physical properties if they contain substantially different amounts of beta phase. Striped, variegated, or indicia containing soap bars made from two or more soaps having substantially the same chemical composition but significantly different beta phase contents are likely to form ridges and surface cracks during manufacture and/or use due to dissimilar physical properties resulting from the differing beta phase contents.

Most commercial toilet soaps contain a mixture of crystals in both the omega and beta phases. The relative amount of each phase is determined from the X-ray pattern of the soap using the short angle scatter method and X-ray crystalography techniques well known in the art.

The beta phase content of a plodded soap material depends primarily on its initial composition and the amount of mechanical working it is subjected to during processing. To obtain a high beta phase content in the soap materials utilized in the invention, generally above 50 percent by weight, preferably between 60 and 100 percent, the initial soap should have a moisture content greater than 13.5 percent by weight and comprise primarily the salts of saturated long straight chain fatty acids, preferably those having a $C_{16}$ and $C_{18}$ carbon chain. Suitable soap materials are then mechanically worked to a sufficient degree to result in the maximum amount of beta phase obtainable with the specific soap composition used, which is generally greater than 50 percent by weight.

The primary means for mechanically working the soap materials are the plodder screws or worms; the plodder pressure plates which contain a plurality of small diameter orifices through which the soap is extruded and, in accordance with one aspect of the invention, an auxiliary shell and tube apparatus, to be more particularly described hereinafter. The auxiliary shell and tube apparatus provides a significant additional amount of mechanical working to both the indicia and base soaps to maximize the beta phase content of each.

In accordance with a further specific aspect of the invention, the indicia forming material is joined with the base soap at the plodder nozzle through which the base soap mass is extruded to form the ultimate soap bar. The insert material is supplied to a point within the barrel of the soap plodder, downstream of the plodding screw and substantially at the plodder nozzle, through a conduit or a number of conduits terminating in indicia forming extrusion dies. The conduit communicates with the worm of a secondary soap plodder that supplies the force necessary to convey the insert material from its source to its point of insertion into the base soap through the indicia forming extrusion dies.

The terminal point of the extrusion dies i.e., the point at which the indicia forming soap joins the base soap, should be at or immediately prior to the plodder nozzle. An extrusion die terminal point that is located a significant distance before the plodder nozzle tends to produce indicia that is less distinct that when the indicia and base soap are joined in the immediate vicinity of the plodder nozzle, resulting in a less desirable product. Advantageously, the insert soap material is continuously discharged through the indicia forming extrusion dies and into the body of the base soap material to form indicia that extends completely through, and is visible on opposite faces of the final soap bar.

Normally, soap is formed into bars by discharging the plastic soap mass through a plodder nozzle having a cross section corresponding to the thickness and width of the final bar. The extruded, continuous log is then cut into segments equal to the desired bar length. Conventional soap bars of this type have an extrusion grain running parallel to their longitudinal axis and major faces. Such soap bars are subsequently pressed to final shape by forces directed transverse to the major faces and extrusion grain of the bar.

In accordance with the invention, the plodder nozzle of the apparatus has a cross section corresponding to the major faces of the final bar, so that the inserted indicia extends between the major faces. Contrary to the aforementioned conventional procedure of forming soap bars, the new indicia containing log of soap material is discharged from the plodder nozzle and cut into sections at intervals equal to the desired thickness of the individual soap bars. Consequently, the extrusion grain imparted to the new bars during their discharge from the plodder nozzle runs transverse, rather than parallel, to the major faces of the soap bar. The new bars must therefore be pressed to their final shape by forces directed parallel rather than transverse to the extrusion grain, as is customary when the extruded soap material is cut at intervals equal to the desired length of the final soap bar.

In accordance with a specific aspect of the invention, the new indicia containing soap bars are pressed and shaped to a desired and predetermined configuration without seriously roughening or cracking the major faces by maximizing the beta phase content of both soaps. Beta phase soap is characteristically more plastic and moldable than omega phase scap and less subject to roughening and cracking when pressed by forces directed parallel to the extrusion grain. To maximize the beta phase content of the soaps they are advantageously plodded through what is known in the industry as a Mazzoni plodder, in series with the auxiliary shell and tube apparatus to be more specifically described hereinafter. The Mazzoni plodder typically has a high pressure extrusion screw and, typically, two or three pressure plates which have a plurality of small orifices, through which the soap is extruded. The combination of a high pressure extrusion screw and small orificed pressure plates subjects the soap material to a high degree of mechanical working.

Additionally, and in further accordance with the invention, the new apparatus includes an auxiliary shell and tube assembly disposed between the main plodder worm and the plodder nozzle. The tube side of the shell and tube assembly, including a plurality of tubular passageways is supplied with base soap material by the worm of the primary plodder while the shell side receives soap material from a secondary plodder. The shell and tube assembly of the new apparatus functions to keep the base soap material and indicia soap material physically separate but in thermal contact until the insert material is discharged through the indicia forming extrusion die into the base soap material in the immediate vicinity of the plodder nozzle. The shell and tube assembly and related indicia extrusion dies and conduits additionally provides a substantial amount of mechanical working and beta phase conversion to both soaps.

The apparatus method, and soap bars of the invention will now be described with reference to the accompanying drawing, in which FIG. 1 is a schematic partial view of a production line for producing indicia containing soap bars.

Figure 1:
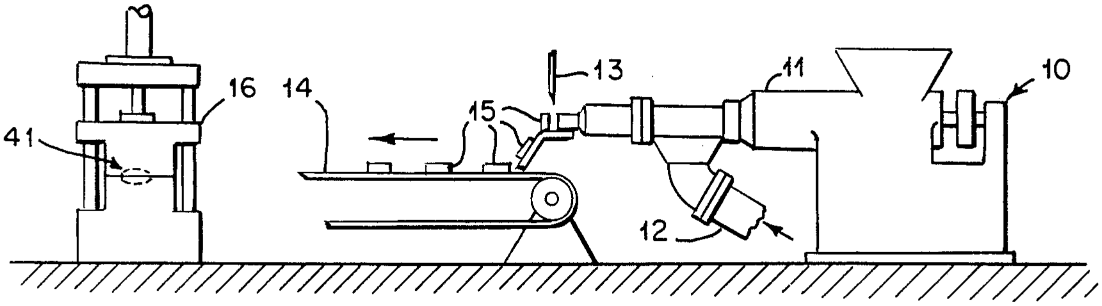

Referring to FIG. 1, the terminal portion of a soap production line, including the apparatus of the invention, generally indicated by the numeral 10, is shown. The production line of FIG. 1 includes a primary plodder 11, a secondary plodder 12, a cut off knife 13 for cutting the continuous extrudant into segments equal to the desired thickness of the final soap bar, and a conveyor mechanism 14 for conveying the rough cut bars 15 to a soap pressing station 16 wherein the bars are shaped to the desired final configuration. Either one or both of plodders 11, 12 can be and preferably are of the Mazzoni type with high pressure extrusion screws or worms.

Figures 2, 3:
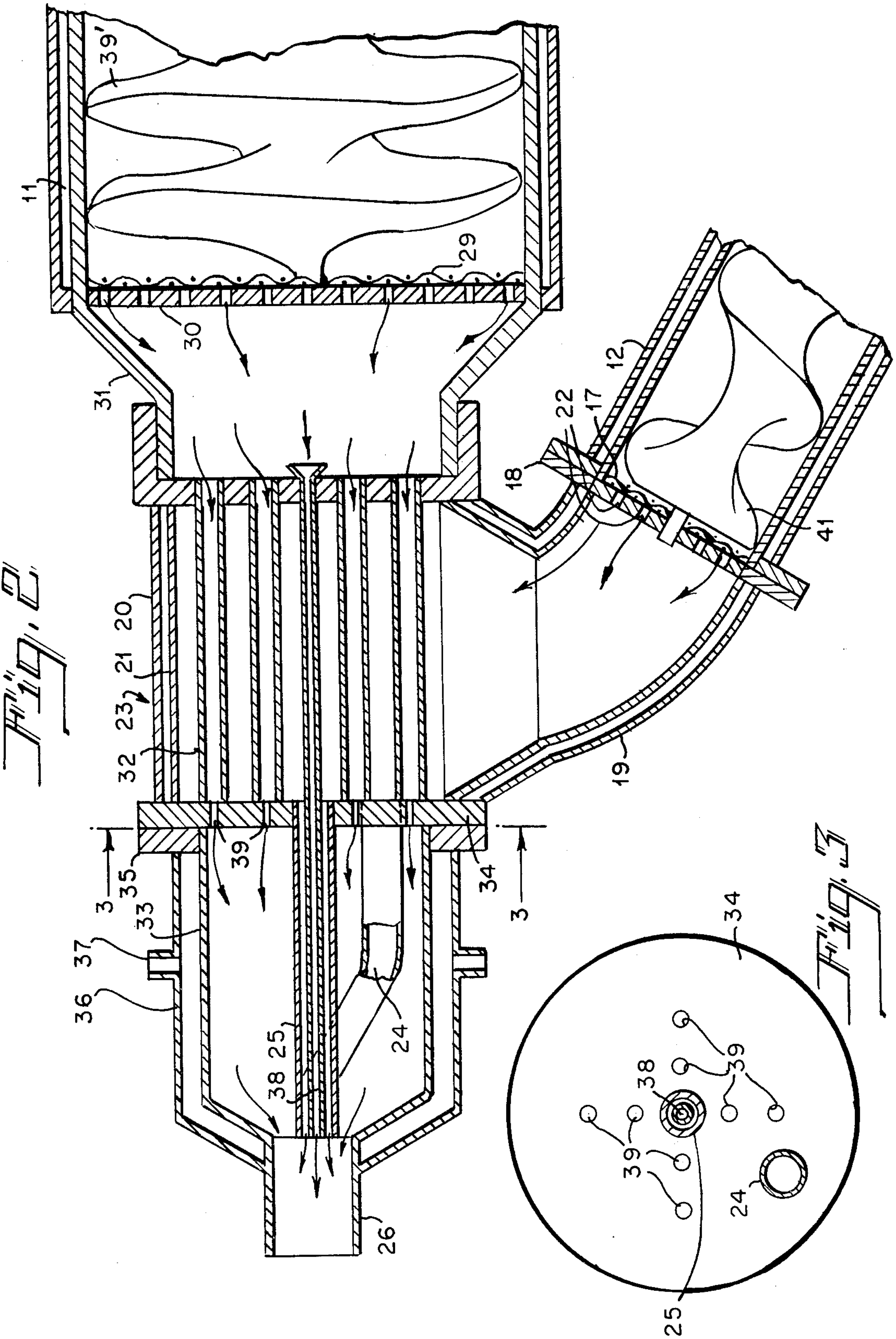
FIG. 2 is a cross sectional elevation of the forward portion of the plodder-extruder apparatus of the invention.
FIG. 3 is a cross sectional view taken along line 3—3 of FIG. 2 showing the discharge pressure plate of the shell and tube assembly.

As shown in FIG. 2, the insert soap material is plodded by the secondary plodder 12; forced through a screen 17 and a pressure plate 18 into the jacketed connecting elbow 19 which is joined to shells 20 and 21. The screen 17 has many uniform size openings of about 0.5 mm to about 2 mm in diameter. The pressure plate 18 functions primarily as a support for screen 17 and has orifices 22 corresponding to the openings in screen 17. The combination of screen 17 and pressure plate 18 provides mechanical working to the indicia forming soap as it flows from the plodder worm into the connecting elbow 19. The elbow 19 is held by bolted flanges or other suitable means to the secondary plodder 12. The insert soap material is supplied to the shell side of the shell and tube assembly 23, from which it is fed through conduits 24, 25 to a point immediately before or at the plodder nozzle 26 where it is discharged through the indicia forming extrusion dies 27, 28 (see FIG. 4).

The base soap material is plodded through the primary plodder 11 and is forced through screen 29 supported by pressure plate 30 into the plodder cone section 31, and into the tube side of the shell and tube assembly 23. The screen 29 and pressure plate 30 are similar to corresponding elements 17 and 18 in the secondary plodder 12 and function to mechanically work the base soap material as it passes from the plodder worm into the cone section 31.

The base soap material is fed from the plodder cone 31 through the tubes 32, into the barrel 33 and through the plodder nozzle 26. The barrel 33 is joined to the shell and tube assembly 23 by means of bolted flanges 34, 35 or other suitable means, and is jacketed by cylinder 36 which forms a space for the circulation of heating or cooling mediums around the barrel 33. The heating or cooling medium can be supplied and removed from the cylinder by suitable means such as couplings 37. The shell 21 is similarly jacketed by the cylinder 20 which forms means for circulating a heating or cooling medium. Suitable inlet and outlet means (not shown) are provided to supply and remove heating or cooling mediums from cylinder 20.

The plodder nozzle 26 receives the soap mass, including extruded indicia deposited by the extrusion dies 27, 28, from the barrel 33, and forms it into a continuous log having a cross section corresponding to the major face dimensions of the soap bar. Accordingly, the plodder nozzle 26 has interior dimensions substantially equal to the desired length and width of the final bar. The continuous log leaving the plodder nozzle 26 is cut into segments corresponding to the desired thickness of the final bar by a suitable cutting knife 13 and the rough cut bars 15 are thereafter conveyed by conveyor means 14 to a suitable soap press 16. The rough cut bars leaving cutting knife 13 are characterized by having an extrusion grain running transverse to the major faces of the bar.

Figure 4:
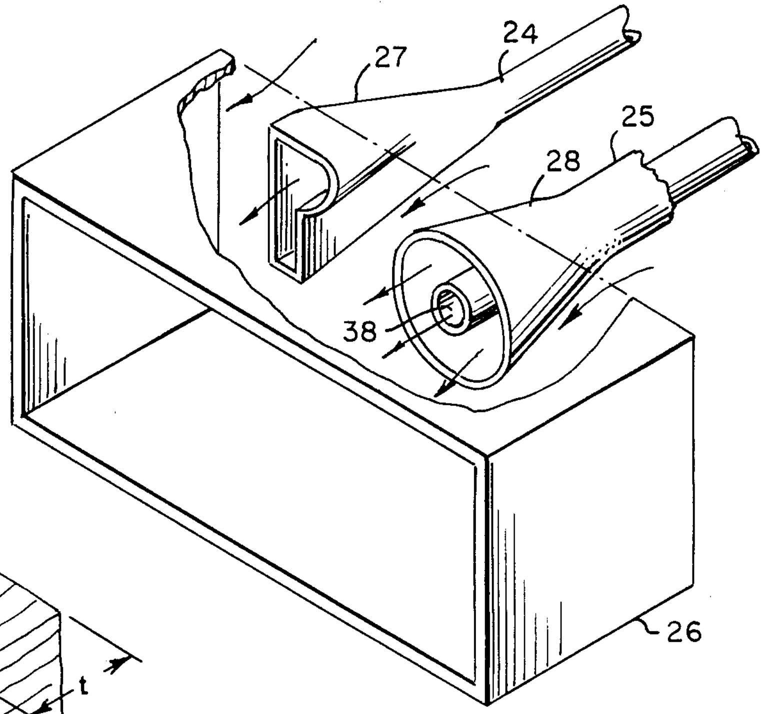
FIG. 4 is a partial front perspective view of the plodder extruder apparatus.

The conduits 24, 25 communicate with the shell side of the shell and tube assembly 23 and terminate in indicia forming extrusion dies 27, 28 (see FIG. 4). When forming letters such as 0 for insertion into the bae soap mass it is necessary to provide a passageway 38, within the conduit 25 and die 28 in order to supply a cylinder of base soap material to the center of the letter. As shown in FIG. 2, the passageway 38 communicates with the conical section 31 of the primary plodder 11. Base soap material is forced, by operation of the main plodder worm 39, through the passageway 38 (as well as through tubes 32), and into the center of the donut shaped extrudant discharged by extrusion die 28.

In accordance with a specific aspect of the invention, the insert material carrying conduits 24, 25 terminate at, or in the immediate vicinity of the plodder nozzle 26 in order to minimize distortion of the insert material after it is extruded in the form of indicia into the base soap material. It has been found that best results, i.e., the most distinct indicia, are obtained when the insert soap material is discharged into the base soap material as the base soap is entering the plodder nozzle.

The shell and tube assembly 23, in accordance with the invention, includes a plurality of tubular passageways 32, which are of internal diameters of from 0.4 or 0.5 to 2 centimeters and will usually be from 10 to 50 centimeters long. These tubes form a number of parallel passageways, generally from 3 to 100 and preferably from 5 to 50. The tubes 32 may communicate with orifices 39 in flange 34 that are substantially smaller in diameter than the tubes 32. Orifices 39 are usually from 0.5 to 10 millimeters in diameter. In accordance with a preferred aspect of the invention, the orifices 39 are about one tenth the diameter of the tubes 32 e.g., when the tubes 32 have an inside diameter of 1 cm. the orifices 39 are preferably 1 mm in diameter. The transition of the base soap material from tubes 32 to orifices 39 provides a substantial amount of mechanical working to the base soap prior to the plodder nozzle and substantially contributes to the maximum conversion of the base soap to beta phase.

The insert soap conduits 24, 25 and extrusion dies 27, 28, are chosen to produce indicia of the desired size and configuration. In accordance with a further specific aspect of the invention, the combined cross sectional area of conduits 24, 25 is substantially less than the free cross sectional area of the shell side of shell and tube assembly 23. The mechanical working of the insert soap material resulting from the passage from the shell side of shell and tube assembly 23 to the conduits 24, 25 substantially contributes to the conversion of insert soap material to beta phase.

In contrast with the typical method of producing soap bars, wherein the bars are extruded in a direction parallel to the major faces of the bar, and the extrusion grain is consequently parallel to the major faces of the bar. The new indicia containing soap bar 15 is extruded in a direction transverse to its major faces and consequently has an extrusion grain 40 running transverse to its major faces (see FIG. 6).

Figure 5:
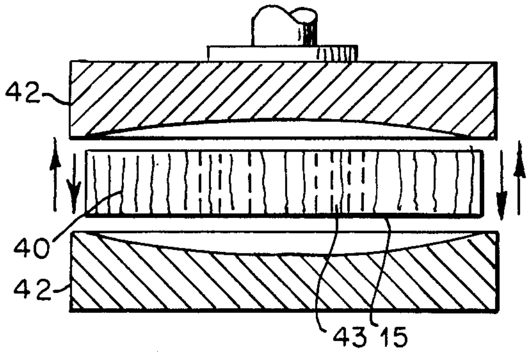
FIG. 5 is a schematic cross sectional view of soap pressing dies before shaping the new soap bars.

Consequently, the individual bars 15, are subjected to pressing forces, indicated by arrows in FIG. 5, parallel to their extrusion grain that are applied by pressing dies 42 in soap pressing apparatus 16. In the soap press 16 the major faces of the bar are engaged by pressing dies 42 which shape the bar to the desired configuration and smooth the surfaces. Since the extrusion grain 40 of the new bars is transverse to its major faces, the pressing dies 42 are applied transverse to the extrusion grain and the forces supplied by the pressing dies are parallel to the extrusion grain of the new bar.

In accordance with a specific and important aspect of the present invention, the new bars are pressed in the foregoing manner, without cracking or imparting a rough texture thereto as is characteristic of prior art bars pressed in this manner. By providing the base soap material and insert soap with a maximum amount of beta phase, the new bars can be pressed in the foregoing manner without significant cracking or surface roughening.

The beta phase content of the processed soaps in maximized in accordance with the invention by providing tubes 32, reduced diameter orifices 39, conduits 24, 25 and extrusion dies for 27, 28, for mechanically working the soap materials, in addition to the screens 17, 29, pressure plates 18, 30 and plodder worms 39', 41. Preferably, both or either one of plodders 11, 12 are Mazzoni plodders which are well known in the art and provide the soap with a substantial degree of mechanical working.

The composition of the base soap material employed is preferably a white or a light colored soap. Preferably, the insert soap material has a color that contrasts with the base soap material. Additionally, the insert soap material should possess physical properties such as water solubility, softeness, moisture content and beta phase content among others, substantially the same as the base soap material and be sufficiently compatible with the base soap so as not to result in degradation of either portion of the final bar due to objectionable oxidation or other reactions.

To make desired products which will be capable of being satisfactorily used as toilet soaps or other washing aids, the physical characteristics of both the base and insert soaps should be essentially the same. Thus, they should be plastic with the same temperature ranges, usually somewhat elevated, and should have essentially the same water solubilities, etc. so that they will hold together tightly and not preferentially dissolve in use, leaving ridges and inequalities in the product. Accordingly, it will be usual for most of the base and insert material to be the same, with only slight differences therein due to coloring materials, possible due to perfumes, plasticizers, or minor proportions of adjuvants. Essentially, the compositions of the base and insert phase will be from 90 to 95% the same. Of course, in addition to color contrasts, there may be other distinctively different adjuvant properties given to the base and insert portions. For example, different perfumes may be employed, one to complement the other, and different minor adjuvants may be present. The soaps employed can be those which are standard in commercial production today e.g., blends of alkali metal soaps, preferably sodium soaps, of tallow and coconut oil fatty acids, of equivalent materials. Normally, these will comprise from 50 to 90% of tallow and from 10 to 50% of coconut oil fatty acid soaps. Preferred are those of 10 to 40% coconut oil soap and 60 to 90% tallow soap.

In accordance with one aspect of the invention, sodium soaps of higher fatty acid are preferred and these are desirably plastic and convertible to high beta phase content when they contain from at least 13.5% to about 25% moisture, on a total basis, although higher moisture content soap can be used e.g. up to about 40%. The soaps will usually be from 80 to 90% of sodium soaps of higher fatty acids most preferably having $C_{16}$–$C_{18}$ straight carbon chains. To make such materials properly plastic, the temperatures of the water or oil jackets employed about the plodders, plodder barrel, and the final shell and tube assembly will usually be in the range of from 30° to 60° C. Generally, it will be desirable to utilize water jackets over plodder parts and at the shell and tube assembly, with an oil jacket being used over the plodder barrel. In either case, the temperature of the soap, for best plodding and fusion will be from about 35° C. to 55° C., most preferably from 38° C. to 45° C.

At the above conditions, with the described apparatus, it will usually be a simple matter to produce a final soap bar of desired appearance and durability. However, in some cases, up to about 10%, usually above 1% of a plasticizer, such as glycerol, polyoxyethylene glycol, sorbitol, other di- or polyhydric alcohols of 2 to 10 carbon atoms and 2 to 6 hydroxyls, petrolatum, paraffin, stearic acid, other higher fatty acid of 10 to 18 carbon atoms, or a hydrotropic compound, such as sodium xylene sulfonate, potassium cumene sulfonate, sodium benzene sulfonate or other lower alkyl-substituted benzene sulfonate may be added to the soap compositions to improve the bonding strength thereof. In some preferred formulas glycerine, potassium soap and sodium toluene sulfonate, will be used together or in various subcombinations.

If desired either one or both of the plodders can be operated under subatmospheric pressure. Vacuum in the plodder may be any subatmospheric pressure but will preferably be from 1 mm. to 300 mm. of Hg absolute, with the lower portions of this range being preferred to deaerate the soaps. Such vacuum will be employed, preferably, in all of the plodders being used. Motor speeds, worm pitches, diameters and root dimaters may vary but usually will not depart from those which are conventional in the usual soap making operations. Thus, worm speeds of 2 to 50 r.p.m., preferably 5 to 25 r.p.m. are generally employed. The worm may be of a diameter from two inches to 16 inches or even more in some cases, but preferably will be between four and ten inches in diameter. The length of the worm and the barrel will usually be from three feet to ten feet. Through puts of soap may be from as little as one pound per minute to fifty or one hundred pounds per minute, depending on equipment sizes.

Materials of construction may be varied, depending on the composition on the detergent being processed. In most cases, stainless steel, polytetrafluoroethylene, nylon or other materials will be preferred in contact parts, although often a good grade of steel may be employed, providing that the equipment is kept well cleansed and free from rust.

In addition to the plodders employed, other conventional soap line equipment (not shown) will be used. This equipment includes amalgamators, mills, elevators, other feeding devices and various measuring devices and automatic controls to help coordinate and synchronize the operations of the different machines. Such apparatuses, although important for the obtaining of the desired chip, ribbon, rod, powder or other material to feed to the plodder, are well known and do not relate closely to the present invention.

Figure 6:
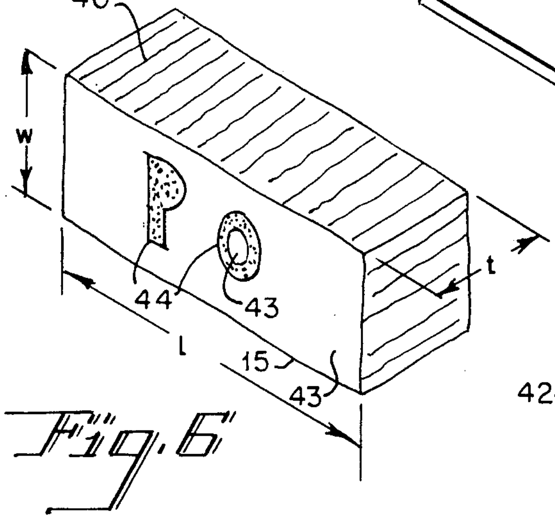
FIG. 6 is a perspective view of a soap bar made in accordance with the invention.

An indicia containing soap bar of the type illustrated in FIG. 6 is made by utilizing the equipment of FIGS. 1-5. The soap base comprises 95.7% sodium soap of a fat charge of 62% beef tallow and 38% coconut oil; 4% distilled palm oil fatty acids; and 0.3% of antioxidants, sequestrants (EDTA) and stabilizers. The soap, initially of a moisture content of about 33% (kettle soap), is dried to a moisture content of about 15%. It is then ready to be used as a base for the indicia containing soap bars of the invention. 95.8 parts of the foregoing soap base, 0.2 parts titanium dioxide Anatase, 1 part perfume, 2 parts water and 1 part glycerine are mixed together to produce a chip which, after moisture loss, has about 15% moisture content. Another soap, this one of a dark green color, is made by milling 94.3 parts of the base chips, 0.3 parts titanium dioxide Anatase, 1 part perfume, 1 part water and 1 part glycerine. To this milled soap, there is added an aqueous "solution" of a water dispersible green pigment, 0.03 part Viscofil Green (Sandoz) in a part water and 0.5 part glycerol. The colored soap so produced is fed into the shell side of the shell and tube assembly 23 by plodder 12 while the base soap is fed through the tube side by the main plodder 11. The production rate employed, while it may be varied, is about 30 lbs./min. and the feed rates are adjusted accordingly.

The various pieces of equipment are jacketed, with the worms of the plodders being water jacketed and with the water therein being held at a temperature of 25°-35° C. The jacket 36 on the barrel 33 is filled with circulating oil at 45°-60° C.

The main plodder worm 39 revolves at about 10 r.p.m. The openings in the pressure plate 30 through which the base soap passes into the plodder cone section 31 are within the range of 2 to 5 mm. During the plodding operations the soap temperature is maintained at about 40° C. and, in the shell and tube assembly this is raised to about 45° C. The base and insert soap materials, although not in physical contact in the shell and tube assembly, are in thermal communication and at approximately the same temperature.

As illustrated in the drawing, the base soap passes through the tubes 32 which number approximately 50, each of which is of a diameter of about 1 cm. and into the barrel 33 after being forced through orifices 39 in plate 34 which have a diameter of about 1 mm. The insert soap material is supplied to the shell side of the shell and tube assembly 23 through pressure plate 18 wherein it surrounds the tubes 32. From the shell and tube assembly, insert soap material is forced into conduits 24, 25 from which it is discharged, through extrusion dies 27, 28 into the base soap mass immediately prior to the plodder nozzle 26. For uniformity in the product, the insert soap material is extruded into the base soap material at substantially the same rate as the base soap material is extruded through the plodder nozzle.

The product of the foregoing process and apparatus is shown in FIG. 6. The rough bar 15 is shown prior to the final pressing step and immediately after being cut from the continuous log extruded through plodder nozzle 26. The bar 15 has a predetermined length (L), width (w), and thickness (t) dimensions; comprises a body portion formed by the base soap material 43 and insert soap material 44. The insert soap material 34 preferably continuously extends between and is visible on both of the opposing major faces which are defined by the L, W dimensions of the soap bar. In accordance with the invention, the soap bar is extruded to its length (L) and width (w) dimensions and is cut into segments equal to the desired thickness (t). Accordingly, the extrusion grain of the new soap bars, 40 runs between the major faces and is transverse to them. Consequently, when the rough bar of FIG. 6 is pressed to its final shape in the soap press between dies 42, shaping forces, are applied parallel to the extrusion grain. Ordinarily, the application of shaping forces parallel to the extrusion grain of a soap bar results in surface cracking and roughness, both of which, of course, are highly undesirable in a commercial product. However, it has been found that the new soap bars, probably because of their soft characteristics due to the high beta phase content imparted by the mechanical working of the apparatus employed, can be pressed to predetermined shape without the foregoing significant adverse consequences.

By providing a method and an apparatus for producing smooth and substantially crack-free soap bars having indicia forming inserts that are retained and are visible for the entire life of the soap bar, the invention represents a significant development in providing a new and attractive soap bar.

It should be noted that the invention has been described with respect to various embodiments thereof but it will be appreciated that it is not limited to these, since equivalents may be substituted for various elements of the new process and apparatus. In determining the full scope of the invention, reference should be made to the following claims.

We claim:

1. A method of producing soap bars having indicia incorporated therein comprising; supplying a first flow of base soap material through the barrel of a plodder and towards a plodder nozzle; discharging a second flow of an insert soap material thru an indicia forming die within said barrel; said insert soap material having substantially the same physical. characteristics including beta phase content as said base soap material mechanically working said base soap material through a plurality of tubular members having a predetermined inside diameter and a plurality of orifices having a diameter substantially smaller than said predetermined diameter to result in a beta phase content is said base soap material greater than 50% by weight, mechanically working said insert soap material through a plodder and said indicia forming die to result in a beta phase content of greater than 50% by weight, said insert soap material being discharged into the body of said base soap material as said base soap material enters said plodder nozzle, said second flow being in the same direction and at substantially the same rate as said first flow; extruding said base soap material through said plodder nozzle to form a continuous log of soap, said extruding step imparting an extrusion grain to said log of soap, and cutting said continuous log of soap into segments equal to the desired thickness of said soap bars.

2. The method of claim 1 wherein said insert soap material is continuously discharged into the body of said base soap material whereby said indicia extends between and is visible on opposing major faces of said soap bars.

3. In the method of incorporating indicia into the body of a soap bar, including the steps of introducing an indicia forming soap material into a base soap material before the base soap material is extruded into said soap bar, the improvement comprising mechanically working the base soap material prior to said introduction of the indicia forming soap material and subsequent to plodding sufficiently to result in a beta phase greater than 50% by weight, and mechanically working the indicia forming soap material prior to introduction into said base soap material to result in a beta phase content in said indicia forming soap material of greater than 50% by weight, said indicia forming material being soap having substantially the same physical characteristics as said base soap material.

4. The improved method of claim 3 wherein said mechanical working of said base soap material includes successively forcing said base soap material through a plurality of tubular members having a predetermined inside diameter and a plurality of orifices having a diameter substantially smaller than said predetermined diameter.

5. The improved method of claim 3 wherein said indicia forming material is introduced into the body of soap material immediately before said base soap material is extruded into said soap bar.

6. The improved method of claim 3 wherein said indicia forming soap is mechanically worked through a plodder and an indicia forming die to result in a beta phase content of greater than 50% by weight.

* * * * *